No. 727,888. PATENTED MAY 12, 1903.
B. B. BOWERS.
STOP MOTION FOR TWINE WINDING SPINDLES.
APPLICATION FILED JULY 14, 1902.

NO MODEL. 2 SHEETS—SHEET 1.

Witnesses
R. A. Boswell.
Franklin H. Hough.

Inventor
B. B. Bowers,
By Wm. B. Matthews,
Attorney

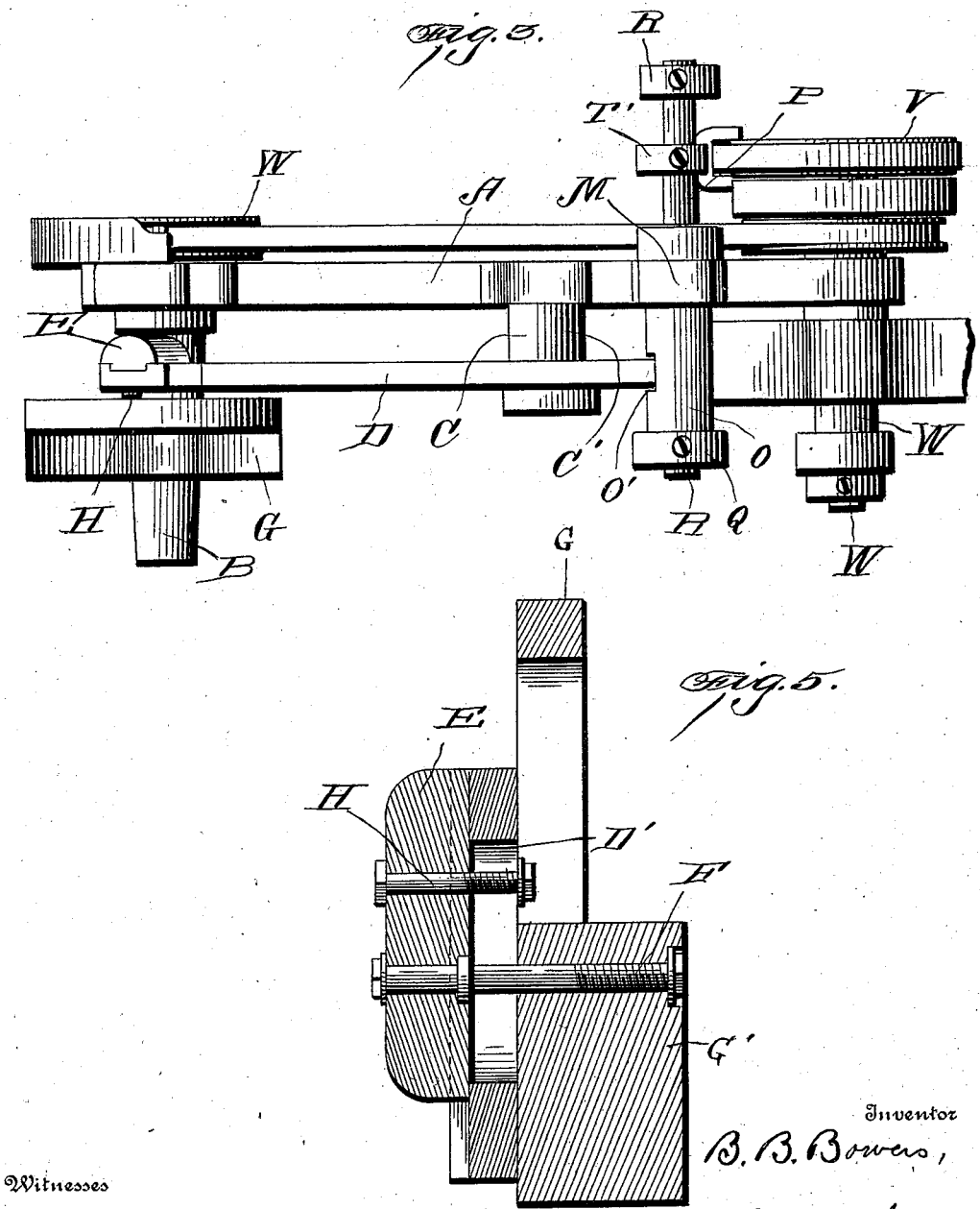

No. 727,888. Patented May 12, 1903.

UNITED STATES PATENT OFFICE.

BOSE B. BOWERS, OF MACON, GEORGIA.

STOP-MOTION FOR TWINE-WINDING SPINDLES.

SPECIFICATION forming part of Letters Patent No. 727,888, dated May 12, 1903.

Application filed July 14, 1902. Serial No. 115,494. (No model.)

*To all whom it may concern:*

Be it known that I, BOSE B. BOWERS, a citizen of the United States, residing at Macon, in the county of Bibb and State of Georgia, have invented certain new and useful Improvements in Weight Stop-Motions for Spindles; and I do hereby declare the following to be a full, clear, and exact description of the invention, such as will enable others skilled in the art to which it appertains to make and use the same.

This invention relates to new and useful improvements in weight stop-motions adapted for use in twine-winding spindles; and it consists in a frame with a tilting lever mounted thereon having a slotted end, a vertically-adjustable block mounted on the lever, an eccentrically-journaled weighted wheel carried by the block, and spring-actuated mechanism for stopping the rotary movement of the winding-spindle.

The invention consists, further, in various details of construction and combinations of parts, as will be hereinafter more fully described, and then specifically defined in the appended claims.

My invention is clearly illustrated in the accompanying drawings, which, with the letters of reference marked thereon, form a part of this application, and in which drawings similar letters of reference indicate like parts in the several views, in which—

Figure 1 is a side elevation of my improved mechanism for stopping a winding-spindle. Fig. 2 is a cross-sectional view looking in the direction of the arrow in Fig. 1. Fig. 3 is a top plan view. Fig. 4 is a detail view showing the spring-actuated mechanism for releasing the lever carrying the weighted wheel. Fig. 5 is a cross-sectional view through the weighted wheel and angle-lever supporting the same.

Reference now being had to the details of the drawings by letter, A designates a frame, in which a shaft B is journaled, on which twine is to be wound on a suitable spool or spindle rotating with said shaft.

C designates a stub-shaft which is carried on the upright C', forming a portion of the frame of the device, and pivotally mounted on said stub-shaft is a lever D, which may be of any suitable shape found best adapted for the purpose for which it is intended. Said lever has an elongated slot D' near one end, and one face of the portion of the lever in which said slot is located is channeled out to receive a plate E, which carries a bolt F, passing through said slot and projecting laterally from the face of the lever sufficiently to form a bearing for an eccentrically-journaled wheel G, having a weighted portion G'. A second bolt H, which is fastened to said plate, passes through the slot D', and by means of a suitable nut and washer on the threaded end thereof it will be observed that the plate, and also the wheel carried thereby, may be raised or lowered for a purpose which will hereinafter appear. Said lever D is of such a length that the weighted wheel G when mounted as described will be positioned directly above the spindle, so that as the twine winds upon the spindle and when it increases in diameter it will contact with the lowest portion of said wheel, and by reason of the frictional contact between the weighted wheel and the twine-winding said wheel will be caused to rotate, and being concentrically journaled the lever carrying the wheel will be caused to tilt.

Mounted in an upright M of the standard is a cylindrical shell or boxing O, which is notched, as at O', and in the bore of said casing is mounted a sliding rod P, which is notched at P', which latter notch when in one position will register with the notch O'. A disk wheel Q is keyed to one end of said rod P, whereby the operator may pull upon said rod, which is spring-actuated by a spring T, hereinafter described, for the purpose of bringing the notch in said rod into registration with the notch O' when it is desired to adjust the free end of the lever D in said notches in readiness for operation in stopping the winding-spindle. Fastened to one end of the rod P is a bar R, to which bar a second rod or arm S is fastened, which in the present instance is shown as parallel with the rod P and spaced apart therefrom a suitable distance. A spring T is fastened at one end of said upright M, and its free end is designed to be held yieldingly against said rod S for the purpose of normally holding said arm or rod and bar R at their farthest limits from the upright M. Keyed to the rod P is a bar T', the lower end of which is forked and is provided as a belt-shifting device. On the shaft W is a pulley which has belted connection with a pulley W' on the shaft carrying the spindle, and V designates an idler onto which the belt may be shifted by the belt-shifting arm when it is desired to start and stop the mechanism.

The operation of my weight stop-motion for winding twine on spindles is as follows: The operator first pulls upon the hand-wheel Q, causing the two notches in the casing O and rod P to come into registration, and the free end of the lever is inserted in said notches. When thus held, it will be observed that the rod P is acted upon by the tension of the spring, which has a normal tendency to hold the notches out of registration. When the lever has been thus adjusted, the belt-shifting arm holds the belt upon the pulley on shaft W, which through its connections with the spindle will cause the latter to rotate and wind the twine. By reason of the wheel G being weighted about a portion of its circumference such weighted part would by gravity normally rest adjacent to the winding-spindle. As the twine being wound increases in size and comes in contact with the circumference of said wheel the frictional contact between the wheel and the twine will cause the wheel to rotate, and being eccentrically journaled the lever D will be caused to tilt, and the free end thereof will draw down out of the registering notches in said casing and rod P, and the spring which bears against the arm or rod S will throw the rod P away from the lever, and the belt-shifting arm will throw the belt off the pulley onto the idler and the spindle will stop. As the twine is removed the weighted wheel will assume its normal position with the weighted portion down, and as soon as the operator resets the free end of the lever in the registering notches, said notches being brought into registration by pulling out the rod P, the belt is again shifted, and the mechanism will be put in motion and a new twine will be wound.

It will be observed that by the provision of the elongated slot in the lever the weighted cam-wheel may be raised or lowered for the purpose of gaging the size of the winding of twine.

Having thus described my invention, what I claim to be new, and desire to secure by Letters Patent, is—

1. A stop mechanism for winding-spindles, consisting of a frame, a tilting lever mounted thereon, having a slotted end, a vertically-adjustable block mounted on said lever, a stub-shaft carried by said block, an eccentrically-journaled weighted wheel on said stub-shaft, a spring-actuated rod having a notch therein, a notched casing in which said rod is mounted to have a longitudinal movement, the free end of said lever designed to engage in said notches when they are brought into registration, and belt-shifting mechanism actuated by said rod as the lever is released from said notches, as set forth.

2. A stop mechanism for winding-machines, comprising a frame, a spindle mounted therein, a lever having a tilting motion, an eccentrically-mounted weighted wheel journaled on said lever, a hollow casing having a notch in its circumference, a rod mounted in said casing and having a notch therein which is adapted to be brought into registration with the notch in said casing, the free end of said lever adapted to engage said notches when in registration, a bar fastened to said rod, an arm or rod secured to the other end of said bar, a spring bearing against said arm, and a belt-shifting bar keyed to said notched rod, as set forth.

In testimony whereof I affix my signature in presence of two witnesses.

BOSE B. BOWERS.

Witnesses:
L. D. MOORE,
B. H. RAY.